United States Patent [19]

Kano et al.

[11] Patent Number: 4,872,000
[45] Date of Patent: Oct. 3, 1989

[54] COORDINATE INPUT APPARATUS

[75] Inventors: Mitsunari Kano, Seto; Yoshiharu Konishi, Kasugai; Toshihiko Matsuda, Owariasahi, all of Japan

[73] Assignee: Hitachi, Ltd., Tokyo, Japan

[21] Appl. No.: 75,526

[22] Filed: Jul. 20, 1987

[30] Foreign Application Priority Data

Jul. 21, 1986 [JP] Japan .................. 62-169724

[51] Int. Cl.[4] .................. G09G 3/02
[52] U.S. Cl. .................. 340/706; 340/815.31
[58] Field of Search .............. 340/706, 707, 708, 752, 340/756, 757, 365 P, 815.31, 711, 712; 358/247, 901; 350/96.26; 178/18, 19

[56] References Cited

U.S. PATENT DOCUMENTS

| 3,567,859 | 3/1971 | Ellis et al. | 340/706 |
|---|---|---|---|
| 3,944,740 | 3/1976 | Murase et al. | 340/706 |
| 4,121,206 | 10/1978 | LeMire | 340/815.31 |
| 4,306,716 | 12/1981 | James et al. | 340/757 |
| 4,309,720 | 1/1982 | Denham | 358/75 |
| 4,349,817 | 9/1982 | Hoffman et al. | 340/815.31 |
| 4,484,179 | 11/1984 | Kasday | 340/712 |
| 4,500,181 | 2/1985 | Takahashi | 350/96.26 |
| 4,673,918 | 6/1987 | Adler et al. | 340/365 P |
| 4,679,909 | 7/1987 | Hamada et al. | 340/707 |
| 4,689,614 | 8/1987 | Strachan | 340/707 |
| 4,694,221 | 9/1987 | Rosier | 358/901 |
| 4,764,885 | 8/1988 | Greanias et al. | 340/708 |

FOREIGN PATENT DOCUMENTS 56-36738  4/1981  Japan .

Primary Examiner—Gerald Brigance
Assistant Examiner—Richard Hjerpe
Attorney, Agent, or Firm—Antonelli, Terry & Wands

[57] ABSTRACT

A coordinate input apparatus which comprises a display unit having a display layer, and a protecting layer disposed on said display layer and having two-dimensionally arranged light guides for transmitting light from the display layer in the direction substantially perpendicular to the display layer, wherein a user designates a coordinate position on the display layer through the protecting layer.

7 Claims, 4 Drawing Sheets

COORDINATE INPUT APPARATUS

BACKGROUND OF THE INVENTION

1. Field of the Invention

The present invention generally relates to a coordinate input apparatus, and particularly relates to a coordinate input apparatus for use in a character input portion of a word processor, in a coordinate input portion of a personal computer, a CAD terminal equipment, or the like, in a slip hand-written character input portion of a bank terminal equipment or the like, and so on.

2. DESCRIPTION OF THE PRIOR ART

Conventionally, a coordinate input apparatus or a character input apparatus, in which a display unit using a liquid crystal and a coordinate input tablet are integrally combined with each other, has been commercialized as an apparatus having a function of coordinate input for indicating coordinates on a displayed picture screen.

In a display unit using a liquid crystal, a CRT, or the like, display is generated by changing the state of the liquid crystal from a transmitting state to a reflecting state to cause the liquid crystal to reflect light, or by causing a fluorescent material inside the display surface of the CRT to be luminous. Thick glass is generally used to protect the surface of the display. Accordingly, when a display is actually effected at a designated position on the display surface in response to designation of coordinates by means of coordinate indicating means, such as a pen having a coordinate designating function, a displacement occurs between the actually displayed position designated by means of the coordinate indicating means and the displayed position recognized by a user through the thick protection glass. Accordingly, the user is required to perform coordinate designation while taking such a displacement into consideration. Thus, there has been an inconvenience in the practical use of such a device. Examples of such a conventional coordinate input apparatus includes those disclosed in Japanese Patent Unexamined Publication No. 56-36738, and so on.

SUMMARY OF THE INVENTION

It is an object of the present invention to provide a coordinate input apparatus in which a difference between a designated coordinate position and a displayed position in response to the coordinate designation recognized by a user is diminished.

In the coordinate input apparatus according to the present invention, light guides for transmitting light from a display layer of a display unit, for example, a phosphor or a crystal liquid in the case where the display unit is a CRT or a liquid-crystal display device respectively, substantially in the direction perpendicular to the display layer, are two-dimensionally arranged over a surface of the display layer so that the light emitted from the display layer is advanced only in the direction substantially perpendicular to the display layer to reach the surface of the light guides. Thus, the position of the actual display surface of the display unit is shifted from the surface of the display layer to the surface of the light guides. The operator performs coordinate designation on the surface of the light guides and the display on the display layer of the display unit in response to the input of this designation is shifted to the surface of the light guides. Accordingly, the displacement between the coordinate position designated by the user and the actually displayed position in response to the designation can be minimized.

A thin glass layer for protecting the display layer may be disposed on the surface of the display layer so that the light guides are arranged on the display layer through the glass layer. Because the light guides also have a function of protecting the display surface, the thickness of the glass layer may be thin. If the glass layer is made thin, the light emitted from the display layer is substantially prevented from coming out of the glass by dispersion.

In the coordinate input apparatus in which light guides are disposed as a protection layer on the surface of a display layer, a display portion which is directly visible by a user is shifted to a display surface on which coordinate designation is performed by the user, so that the user can see as if the display surface is luminous by itself or is changed in its state between reflection and transmission modes. Accordingly, there is such an effect that a parallax between the position of coordinates designated by the coordinate indicating means and the actually visually displayed position can be eliminated.

BRIEF DESCRIPTION OF THE DRAWINGS

These and other objects and features of the present invention will become apparent by reference to the following description and accompanying drawings wherein.

DESCRIPTION OF THE PREFERRED EMBODIMENTS

Figure 1:
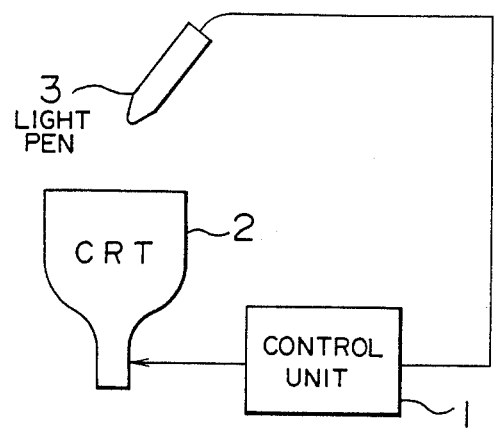
FIG. 1 is a constituent diagram for explaining designation of a coordinate position on a display surface of a CRT display unit.

Referring to the drawings, examples of coordinate designation in the coordinate input apparatus according to the present invention will be described hereunder. FIG. 1 is a theoretical diagram for explaining coordinate designation by the coordinate input apparatus according to the present invention in the case where the apparatus is applied to a CRT display unit. A display surface of a CRT 2 is scanned under control by a control unit 1 with a blue beam which is hardly seen by a user. When the user designates a certain position on the display surface with a light pen 3, the control unit 1 can discriminate the designated position on the display surface by identifying the temporal position of the blue beam discriminated by the light pen 3. The discriminated designated-position on the CRT display surface is made luminous by a white beam, or the like, under the control by the control unit 1, so that the user recognizes that the display unit has received the coordinate input.

Figure 2:
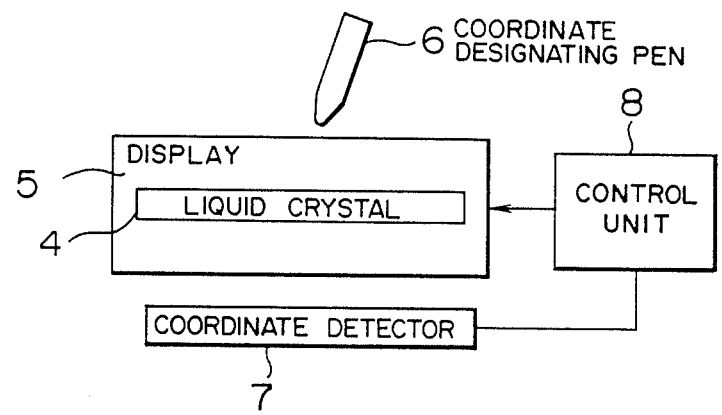
FIG. 2 is a constituent diagram for explaining designation of a coordinate position on a display surface of a liquid-crystal display unit.

FIG. 2 is a theoretical diagram for explaining coordinate designation by the coordinate input apparatus according to the present invention in the case where the apparatus is applied to a liquid-crystal display unit. It is assumed that the liquid crystal is normally in the state in which the liquid crystal can transmit light therethrough. A user performs coordinate designation by indicating a desired position on a display surface of a display 5 containing a liquid crystal 4 by means of a coordinate designating pen 6. The pen 6 is provided at its inside with a coil which is arranged to produce lines of magnetic force when energized so that the lines of magnetic force are detected by means of a coordinate detector 7, which detects magnetism, to thereby detect the designated coordinate position. The liquid-crystal portion at the designated coordinate position is put into a state where the liquid crystal can reflect light, under the control by the control unit 8 in response to the detection of the designated coordinates, so that the user can recognize the fact that the coordinate designation has been received by the apparatus.

Figure 3:
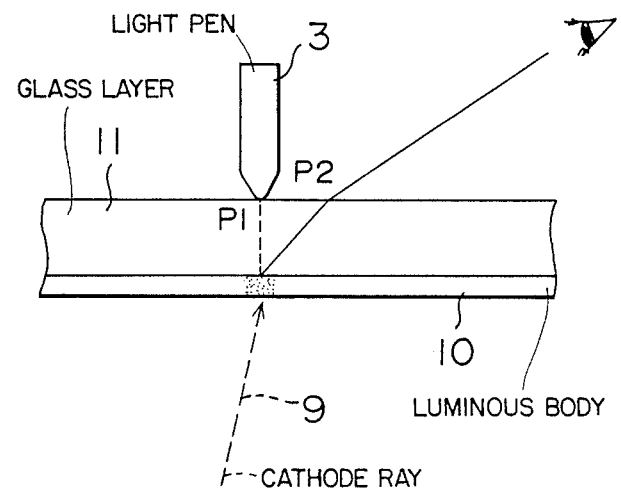
FIG. 3 is a diagram for showing the relation between designation of a coordinate position and the display corresponding to the designation on the conventional CRT display unit.
Figure 4:
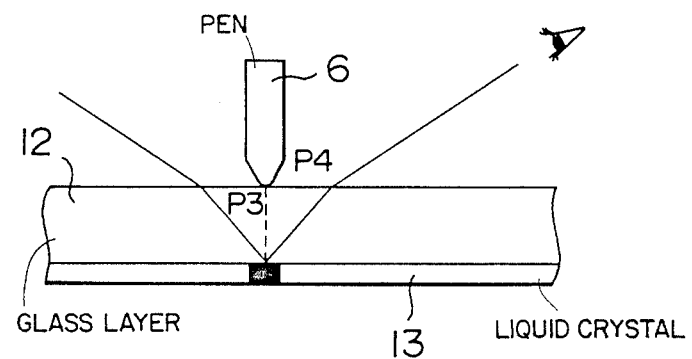
FIG. 4 is a diagram for showing the relation between designation of a coordinate position and the display corresponding to the designation on the conventional liquid-crystal display unit.

Referring to the drawings, the problems in the prior art will be described prior to the description of the preferred embodiments of the present invention. FIG. 3 illustrates the state in which coordinates are designated in a CRT display unit. In the display unit, assuming that a position $P_1$ on a display surface is designated by a light pen 3, then a luminous body 10 on the display surface is caused by cathode rays 9 to emit light at a portion corresponding to the designated position in response to the coordinate designation by the light pen 3. In this case, the user looks at the display surface as if a point $P_2$ different from the point $P_1$ designated by the light pen 3 were made to emit light owing to the existence of a glass layer 11. FIG. 4 illustrates the state in which coordinates are designated in a liquid crystal display unit. In the display unit, even if a liquid crystal 3 is made to reflect light at a portion corresponding to the coordinate designation in response to the coordinate designation by a pen 6, the user looks at the display surface as if the light were reflected at a point $P_4$ different from the point $P_3$ designated by the pen 6 owing to the existence of a glass layer 12.

The present invention has been attained to solve those problems in the prior art.

Next, an embodiment of the coordinate input apparatus according to the present invention will be described.

Figure 5:
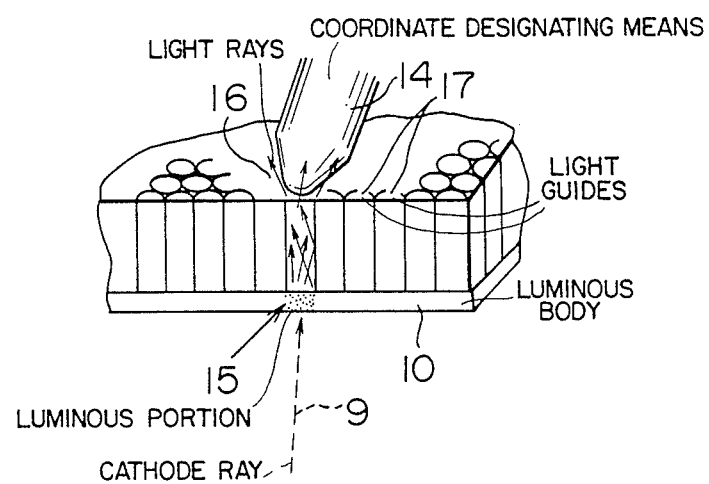
FIG. 5 is a diagram showing an arrangement of an embodiment of the coordinate input apparatus according to the present invention which is applied to a CRT display unit.

FIG. 5 illustrates an embodiment of the present invention in which light guides 17, such as pieces of glass fiber which can lead light therethrough, are arranged over a surface of a CRT. Now, assume that a luminous body 10 is illuminated by a cathode ray 9 at a luminous portion 15 thereof directly under the position designated by coordinate designating means 14 such as a light pen. The light emitted from the luminous portion 15 of the luminous body 10 advances substantially vertically through one of the light guides 17 as indicated by the reference numeral 16 and never leaks to any other portions. Therefore, the display portion looks as if the luminous portion 15 were never emitting light, but the position designated by the coordinate designating means 14 on the light guide surface were emitting light. Accordingly, the user will never erroneously recognize that a position different from the position designated by the coordinate designating means 14 is emitting light.

Figure 6:
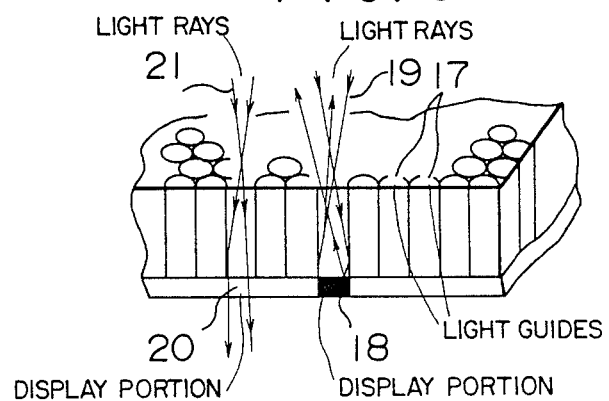
FIG. 6 is a diagram showing an arrangement of an embodiment of the coordinate input apparatus according to the present invention which is applied to a liquid-crystal display unit.

FIG. 6 illustrates an embodiment according to the present invention in which light guides are arranged over a surface of a liquid crystal. Now, assume that a display portion 18 is in a light reflecting mode. At that time, the externally applied light on the surface of one of the light guides 17 advances as indicated by the reference numerals 19 into the light guide 17 and comes out again out of the same light guide 17 after being reflected by the display portion 18. That is, it looks as if the reflection is effected on the surface of the light guide so that it looks as if the position of the display portion 18 were shifted to the coordinate designating surface. On the contrary, assume that a display portion 20 is in a light-transmitting mode and that light is externally applied as indicated by the reference numeral 21 to one of the light guides 17 directly above the display portion 20, then the light 21 advances through not only the light guide 17 but the display portion 20 as clearly shown in the drawing, so that the light does not reflect back to the surface of the light guide. Accordingly, also in this case, the user will never erroneously recognize that a position different from the position designated by coordinate designating means is emitting light.

Thus, in the embodiments of FIGS. 5 and 6, the light guides are arranged directly over the surfaces of the luminous body of the CRT and the liquid crystal so as to make the light guides act also as layers for protecting the CRT and the liquid crystal, respectively. However, alternatively, the light guides may be arranged on a protecting thin glass layer provided on each luminous body of the CRT and the liquid crystal.

Figure 7:
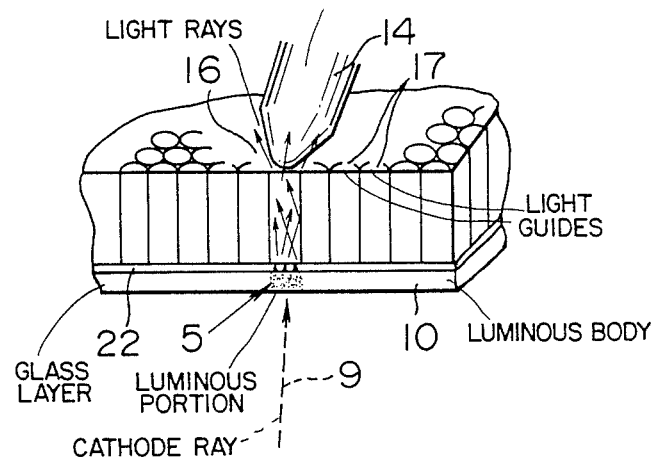
FIG. 7 is a diagram showing an arrangement of another embodiment of the coordinate input apparatus according to the present invention which is applied to a CRT display unit.
Figure 8:
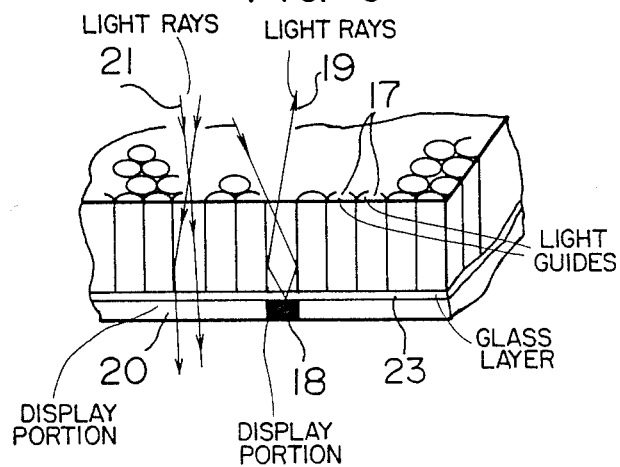
FIG. 8 is a diagram showing an arrangement of another embodiment of the coordinate input apparatus according to the present invention which is applied to a liquid crystal display unit.

FIG. 7 illustrates the arrangement of a CRT display unit in which light guides 17 are provided over a luminous body through a thin glass layer 22, and FIG. 8 illustrates the arrangement of a liquid crystal display unit in which light guides 17 are provided over a liquid crystal through a thin glass layer 23. The arrangements in FIGS. 7 and 8 are the same as those in FIGS. 5 and 6 except the provision of the glass layers 22 and 23, respectively.

Because the light guides can be made to have a function of surface protection, the thickness of the glass layer on the luminous body or the liquid crystal can be made thin. If the glass layer is made thin, the light emitted from the luminous portion or the light reflected from the liquid crystal portion is substantially prevented from coming out of the glass by wide dispersion.

The present invention can be applied to a self-light-emitting display unit such as a CRT, an EL panel, or the like, as well as a display unit such as a liquid crystal in which display is carried out in a reflecting/transmitting mode. In any case, the substantial display surface of the display unit can be shifted to the surface on which coordinate designation is performed, so that it is possible to obtain a coordinate input apparatus in which a user finds no displacement between the designated coordinate position and the actual displayed position.

As the light guide arrangement according to the present invention, it is possible to use an arrangement in which short pieces of optical fibers made of glass fibers, plastic fibers, or the like, are two-dimensionally disposed in close relation to each other, or another arrangement in which short pieces of thin metal pipes having a high reflection factor are two-dimensionally disposed in close relation to each other.

What is claimed is:

1. A coordinate input apparatus comprising a display unit provided with a display layer, and a transparent protecting layer provided on said display layer so that, when a desired coordinate position on said display layer is designated through said protecting layer to thereby input coordinate position information, said display layer produces a visible indication on the outer surface of said protecting layer, said protecting layer comprising a layer of light guides two-dimensionally arranged so as to transmit light form a spot on said display layer in the direction substantially perpendicular to said display layer to a spot on the outer surface of said protecting layer, so as to minimize apparent displacement between a designated coordinate position on said display layer and the position of a resulting visual indication on said outer surface of said protecting layer.

2. A coordinate input apparatus according to claim 1, wherein said protecting layer further comprises a thin glass layer provided between said display layer and said layer of light guides and having a thickness which is substantially less than the thickness of said layer of light guides for protecting said display layer while adding structural strength to said protecting layer.

3. A coordinate input apparatus according to claim 1, wherein said light guides include short pieces of optical fibers made of glass fibers two-dimensionally arranged in close relation to each other.

4. A coordinate input apparatus according to claim 1, wherein said light guides include short pieces of optical fibers made of plastic fibers two-dimensionally arranged in close relation to each other.

5. A coordinate input apparatus according to claim 1, wherein said light guides include short pieces of metal pipes having a high reflection factor two-dimensionally arranged in close relation to each other.

6. A coordinate input apparatus according to claim 1, wherein said display unit is a CRT.

7. A coordinate input apparatus according to claim 1, wherein said display unit includes a liquid crystal display unit.

* * * * *